Patented Feb. 12, 1946

2,394,963

UNITED STATES PATENT OFFICE 2,394,963

PREPARATION OF 2-AMINOPYRAZINE

Moses L. Crossley, Plainfield, N. J., and Jackson P. English, Stamford, Conn., assignors to American Cyanamid Company, New York, N. Y., a corporation of Maine No Drawing. Application April 18, 1942, Serial No. 439,562

4 Claims. (Cl. 260—250)

This invention relates to a method for preparing 2-aminopyrazine. More particularly it relates to a method for preparing 2-aminopyrazine by a method employing pyrazine itself as an intermediate.

The methods proposed in the past for the production of 2-aminopyrazine are lengthy processes which are not well suited for commercial use. One of the earliest processes described for the production of 2-aminopyrazine is that of Gabriel and Sonn (Ber. 40, 4851-4860 (1907)) wherein pyrazine 2,3-dicarboxylic acid was used as the starting material. Their process requires a relatively large number of steps and results in the production of low yields of relatively impure product. Hall and Spoerri (J. A. C. S. 62, 664-65 (1940)) describe a method for synthesizing 2-amino pyrazine by a modification of the Gabriel and Sonn method. The Hall and Spoerri method comprises the steps of heating pyrazine 2,3-dicarboxylic acid to give 2-carboxylic acid which is converted to the methyl ester and then reacted with ammonia to give pyrazine 2-carboxyl amide. The pyrazine 2-carboxyl amide is then subjected to a Hoffmann degradation to give 2-aminopyrazine. The 2-aminopyrazine produced by the method of Hall and Spoerri is satisfactory as far as purity is concerned. On the other hand, the number of steps required makes the process undesirable for the commercial production of 2-aminopyrazine at a reasonable cost.

Certain derivatives of 2-amino pyrazine, namely the sulfonamido derivatives show promise of becoming important chemotherapeutic agents. It is extremely desirable therefore that methods be developed for the production of 2-aminopyrazine on a commercial scale at a lower cost than heretofore possible. In accordance with the present invention we have discovered a method for the production of 2-aminopyrazine using pyrazine as the starting material and which process overcomes the undesirable features of the prior art process.

According to the present invention 2-aminopyrazine is produced by a process which comprises reacting pyrazine with an alkali metal or alkaline earth metal amide. In carrying out our invention pyrazine is reacted with a metallic amide such as sodium amide preferably in liquid ammonia for a sufficient period of time for completion of the reaction, after which the ammonia is evaporated and the 2-aminopyrazine recovered from the residue. The 2-aminopyrazine may be conveniently recovered by taking the residue up in a saturated aqueous solution of potassium carbonate and then extracting with ether. The 2-aminopyrazine is obtained in a relatively pure form by evaporation of the ether. If desired, it may be further purified by crystallization from benzene or by codistillation with a high boiling kerosene fraction.

The invention will be described in greater detail in conjunction with the following specific examples. These examples are merely typical illustrations and the invention is not to be limited to the exact detail set forth therein. The parts are by weight.

*Example 1*

4 parts of pyrazine, 3.2 parts of sodium amide, and 30 parts of liquid ammonia were closed in a steel autoclave and shaken at room temperature for 12 hours. The ammonia was vented and the residue hydrolyzed with 25 parts of ice water. The aqueous solution was saturated with potassium carbonate and extracted with ether. The ether extract was dried and distilled, leaving, as a residue, 2-aminopyrazine. This may be further purified if desired by crystallization from benzene, by codistillation with a high boiling kerosene, or by sublimation at reduced pressure.

*Example 2*

4 parts of pyrazine was stirred with 4.8 parts of sodium amide in 50 parts of liquid ammonia for 2 hours. The ammonia was evaporated and the residue worked up as described in the first example and a good yield of purified 2-aminopyrazine was obtained.

In the foregoing examples sodium amide was employed. It may, however, be replaced by other suitable alkali metal or alkaline earth metal amides such as, for example, potassium amide, lithium amide, calcium amide, and the like. We prefer to use sodium amide in our process inasmuch as it is readily available and permits the process to be carried out economically.

In general our process for producing 2-aminopyrazine comprises reacting pyrazine with an alkali metal or alkaline earth metal amide but, we prefer to carry the reaction out in a medium of liquid ammonia. When liquid ammonia is employed as the reaction medium the best results are obtained by carrying the reaction out at about the boiling point of the liquid ammonia. When a liquid medium is employed, it is important to our process that it be liquid ammonia, since we have found that the reaction does not proceed satisfactorily in a number of other liquids which we tested, such as for example, hydrocarbon solvents, dimethyl aniline or triethyl amine.

We claim:

1. A method of producing 2-aminopyrazine which comprises mixing together in liquid ammonia pyrazine and a substance of the group consisting of alkali metal amides and alkaline earth metal amides, allowing the mixture to react and thereafter treating the product thereof with water whereby 2-aminopyrazine is obtained.

2. A method of producing 2-aminopyrazine which comprises mixing together in liquid ammonia pyrazine and an alkali metal amide, allowing the mixture to react at a temperature not substantially in excess of the boiling point of liquid ammonia and thereafter treating the product thereof with water whereby 2-aminopyrazine is obtained.

3. A method of producing 2-aminopyrazine which comprises mixing together in liquid ammonia pyrazine with an alkaline earth metal amide, allowing the mixture to react at a temperature not substantially in excess of the boiling point of liquid ammonia and thereafter treating the product thereof with water whereby 2-aminopyrazine is obtained.

4. A method of producing 2-aminopyrazine which comprises mixing together in liquid ammonia pyrazine with a sodium amide, allowing the mixture to react while cold and thereafter treating the product thereof with water whereby 2-aminopyrazine is obtained.

MOSES L. CROSSLEY.
JACKSON P. ENGLISH.